United States Patent [19]

Leiner

[11] 4,310,860
[45] Jan. 12, 1982

[54] METHOD AND APPARATUS FOR RECORDING DATA ON AND READING DATA FROM MAGNETIC STORAGES

[75] Inventor: Hans-Richard Leiner, Griesheim, Fed. Rep. of Germany

[73] Assignee: Robert Bosch GmbH, Stuttgart, Fed. Rep. of Germany

[21] Appl. No.: 52,127

[22] Filed: Jun. 25, 1979

[30] Foreign Application Priority Data

Jun. 28, 1978 [DE] Fed. Rep. of Germany ....... 2828219

[51] Int. Cl.$^3$ ............................................... G11B 5/09
[52] U.S. Cl. ..................................................... 360/40
[58] Field of Search ........................ 360/40, 45, 41, 43

[56] References Cited

U.S. PATENT DOCUMENTS

| | | | |
|---|---|---|---|
| 3,810,111 | 5/1974 | Patel | 360/40 |
| 3,879,342 | 4/1975 | Patel | 360/45 |
| 4,000,512 | 12/1976 | Lau | 360/45 |
| 4,000,513 | 12/1976 | Precourt | 360/45 |
| 4,017,903 | 4/1977 | Chu | 360/40 |
| 4,027,335 | 5/1977 | Miller | 360/40 |

Primary Examiner—Vincent P. Canney
Attorney, Agent, or Firm—Frishauf, Holtz, Goodman & Woodward

[57] ABSTRACT

An incoming signal sequence coded in accordance with a NRZ-1 code is to be recorded on a magnetic tape after recoding into a Miller code. To eliminate DC components in some Miller sequences, the incoming data bits are examined in sets containing no more than four bits to determine whether sequences with DC components are present. If so, an NRZ coded sequence having no DC component is substituted for the corresponding bits at the output of the Miller coder. At the reproducing end, similar testing takes place to determine whether a substitute signal sequence is present. If such is detected, the NRZ coded signals which it replaced at the coding end are substituted for the corresponding signals in a Miller decoder.

11 Claims, 12 Drawing Figures

METHOD AND APPARATUS FOR RECORDING DATA ON AND READING DATA FROM MAGNETIC STORAGES

Cross-reference to related applications and publications:

U.S. Pat. No. 3,108,261 (Miller) which is hereby incorporated by reference into the present application.

The present invention relates to magnetic recording and read-out of digital coded electrical signals in which the recorded information constitutes a pattern of magnetic flux changes in the storing medium.

BACKGROUND AND PRIOR ART

In a magnetic recording medium, and particularly, on a magnetic tape, it is necessary that as much information as possible be stored per surface unit area. However, the number of possible flux changes per unit length is limited both by the electrical and mechanical characteristics of the medium, for example a tape. For this reason it is desirable to use codes for which a given amount of data can be conveyed in the least possible number of flux changes. However, it is also desired that the selected code be self-synchronizing, so that a special timing or synchronization track is not required. A further requirement is that the code not result in low frequency or DC voltage components since the recording and read-out heads either cannot process these signals at all or cannot process them with sufficient resolution.

In the past, a number of different codes have been developed in which the above-mentioned requirements as to low flux change density, freedom from DC components, self-synchronization and ease of decodability have been met in varying degrees.

A code in which a relative dense storage of data signals is possible is the NRZ-L code. In this code, the binary number "0" is represented by one level, while the binary number "1" is represented by a second level. In a data sequence containing a plurality of the same valued binary numbers following one another, no change of level occurs and therefore no change in flux in the storage medium. In a statistical average, the number of flux changes is therefore less than the number of data bits. The NRZ-L code is therefore very suitable for storing data at a great storage density. It has, however, two drawbacks; first of all it is not self-timing, that is synchronization will be lost in the reproducing apparatus if a great number of equally valued binary numbers follow one another directly, since throughout the sequence no flux change will take place. For the same reason, the spectrum of the signals will have a high portion of low frequency or DC components which cannot be reproduced satisfactorily.

In order to achieve self-timing, a coding system known as the "Miller code" was developed. In the Miller code, each "1" binary number causes a flux change in the middle of the data bit, while each "0" which is preceded by a "1" causes no flux change, each "0" which is preceded by a "0" causing a flux change at the beginning of the bit. The data or information is therefore no longer contained in the levels, but rather in the flux changes. Since flux changes will occur even in relatively long sequences of binary "0"s the synchronization is not lost and the decoding process can take place even without a separate synchronization track. However, the code continues to have low frequency components which can result in changes in the base characteristic due to preponderance of one or the other level during a particular time period.

This condition led to the development of a "0 modulation code" in which the Miller code is modified in such a way that the signal containing the data has no DC component. The idea is to divide the stream of data into two types of sequences: first, sequences in which a number n of binary ones is enclosed by binary zeros and n differs from zero and, secondly, sequences in which a number n of binary ones follow one another. Sequences of the first type in which the number n is even and differs from zero have a DC component when a Miller code is used which, in a stream of such sequences if interrupted by sequences of the second type, may increase to an undefined value. All other data sequences have no DC components. In this system, in sequences having a DC component the zeros are treated in accordance with the Miller code, while the ones are treated as zeros but with every second flux change suppressed. Since the type of sequence can only be ascertained at the end of the sequence, a large number of storages are required which make the system relatively expensive.

THE INVENTION

It is an object of the present invention to furnish a method and system in which information can be recorded on and read out from a magnetic storage and in which, during the coding process, it can be recognized after receipt of no more than four data bits whether a data sequence derived from an NRZ pulse sequence coded in accordance with a Miller code does or does not have a DC component. With the four-bit limit, data bit sequences 00, 010, and 1 do not have a DC component, while the sequences 0110 and 0111 have a DC component which differs from zero. In accordance with the invention, the sequences not having a DC component are coded according to the Miller code, while the data sequences having a DC component are represented by substitute signals having the form 0110 or 0011 coded according to the NRZ-L code, or the complements thereof. Such a substitute signal can be recognized during decoding after a maximum of five bits.

Since the pulse sequences constituting the substitute signal cannot occur with a basic Miller coding, such a pulse sequence will be uniquely recognized during decoding. It is a special advantage of the present invention that the substitute signal sequence requires a lesser number of flux changes than does the corresponding Miller coding, so that the bandwidth of the storage arrangement need not be increased, while the storage density is not decreased.

DRAWINGS ILLUSTRATING A PREFERRED EMBODIMENT

In the following, pulse sequences coded in accordance with the NRZ code will be denoted as follows:

0111 ...

while Miller coding will be represented by

M(0111 ... )

Each data stream coded in accordance with the NRZ code can be divided into two types of data sequences:
(a) 01110: that is, n ones, enclosed by zeros; $n \geq 0$;
(b) 1111: n ones.

In a Miller coding, only the type a sequences with n even and not equal to zero generates a DC component.

If a maximum of four bits is to suffice for recognition of a sequence, the two combinations 0110 and 0111 are combinations which generate a DC component unequal to zero. The last combination results from limiting group a to the above-mentioned four bits. An unlimited sequence of type a above can only be achieved with a theoretically infinitely large storage.

It is thus required to substitute a signal sequence having a DC component of zero for the sequences M(0110) and M(0111).

It is a second requirement that the substitute signal sequence will be uniquely recognized as such during the decoding process.

Sequences in which both of these requirements are fulfilled are the sequences 0110 and 0011 and their complements.

Figure 1A:
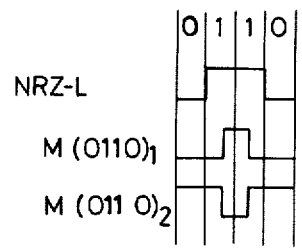
FIGS. 1a and 1b are pulse diagrams for illustrating the relationship between the NRZ and Miller codes.
Figure 1B:
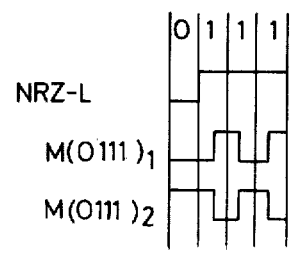

Since the information in signals coded according to the Miller code does not lie in the levels, but in the transitions, it follows that the sequences M(0110) and M(0111) each may be represented in two ways as shown in FIGS. 1a and 1b.

Four substitute signal sequences must then be provided for four Miller code sequences. The four substitute signal sequences are to be assigned to the Miller coder sequences in such a way that the levels outside of the sequences are not affected. Since the sequence M(0110) and 0110 or 1001 all have the same level at the beginning and end of the sequence and since the sequences M(0111) and 0011 or 1100 have different levels at the beginning and end (FIG. 1) the assignment will be as follows:

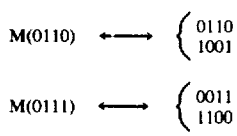

Figure 2A:
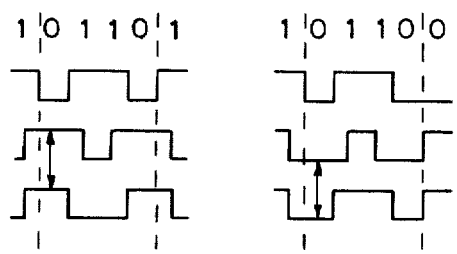
FIGS. 2a and 2b are pulse diagrams in which the level of the substitute signal sequence is matched to that of the Miller sequence.
Figure 2B:
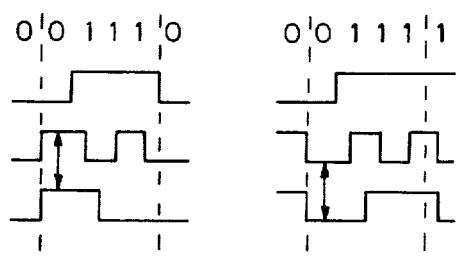

The choice as to whether a substitute signal sequence or its complement are to be used depends upon the level of the first zero of M(0110) or M(0111). Examples are shown in FIGS. 2a and 2b.

Figure 3A:
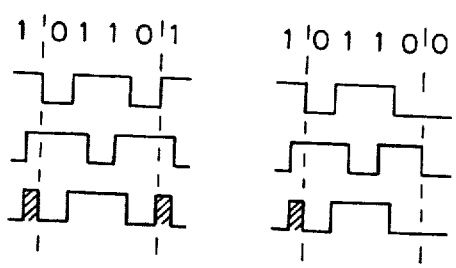
FIGS. 3a and 3b are pulse diagrams in which the level of the substitute signal sequences is not matched to that of the Miller sequence.
Figure 3B:
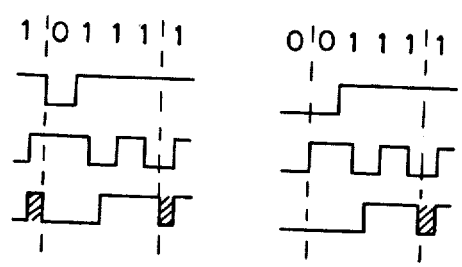

This particular choice of the substitute signal sequences has the additional advantage that no new high frequency components are generated as would be the case for an assignment in accordance with FIGS. 3a and 3b.

To summarize, the particular choice of substitute signal sequences and their assignment has the following advantages:

The DC component of the modified Miller code becomes zero;

The data sequence outside of the substitute signal sequences is not affected;

No additional high frequency components are generated.

Figure 4:
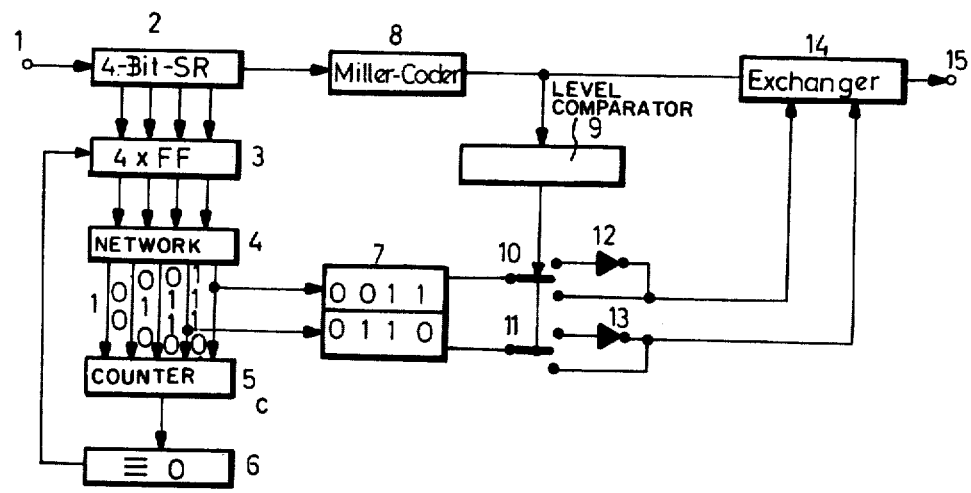
FIG. 4 is a schematic diagram illustrating a Miller coder modified according to the present invention.
Figure 5:
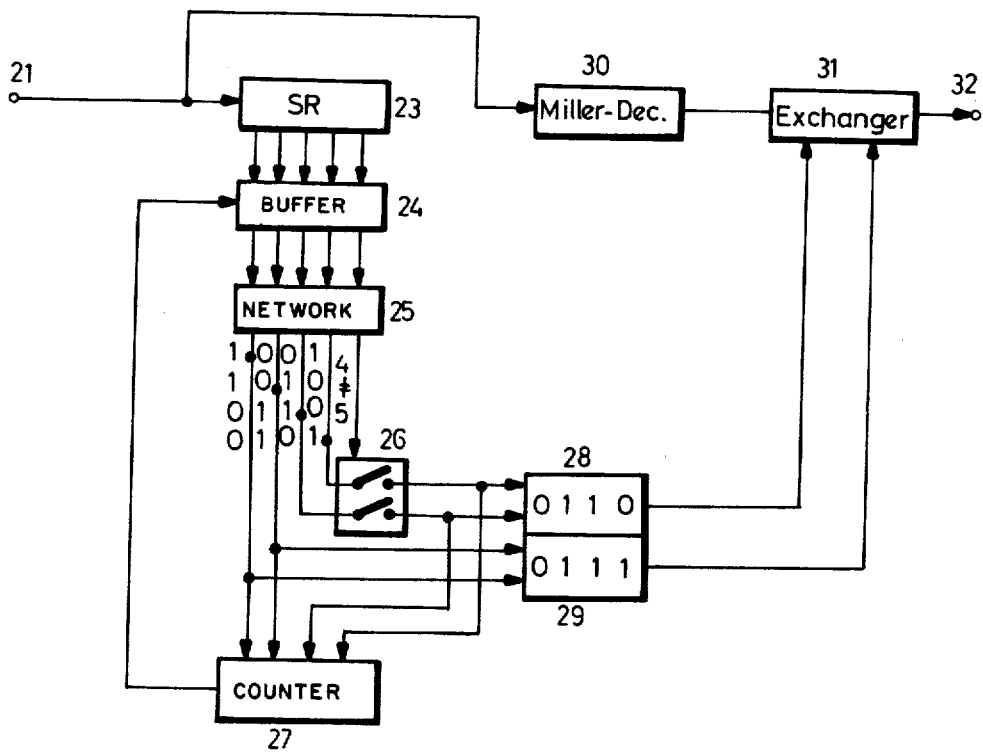
FIG. 5 is a schematic diagram of a Miller decoder modified in accordance with the present invention.

The block diagram of a Miller coder in accordance with the present invention is shown on FIG. 4, that of the decoder in FIG. 5.

In the coding apparatus (FIG. 4) the incoming NRZ-L sequence at a terminal 1 is read into a four-bit shift register 2. Testing for the sequences 1, 00, 010, 0110, and 0111 takes place under control of flip-flops 3 and a network 4. A counting network 5 blocks flip-flops 3 in accordance with the associated length of the tested data in order to prevent a second evaluation. If a 0110 or 0111 sequence is recognized, the sequences 0011 or 0110 stored in storage 7 or their complements are substituted therefor and exchanged in exchanger 14 with the coded sequence M(0110) or M(0111). A level comparator 9 connected following Miller coder 8 cooperates with selector switches 10, 11 and inverters 12, 13 to select whether the substitute signal sequence stored in storage 7 or its complement is to be exchanged for the Miller sequence.

Figure 6:
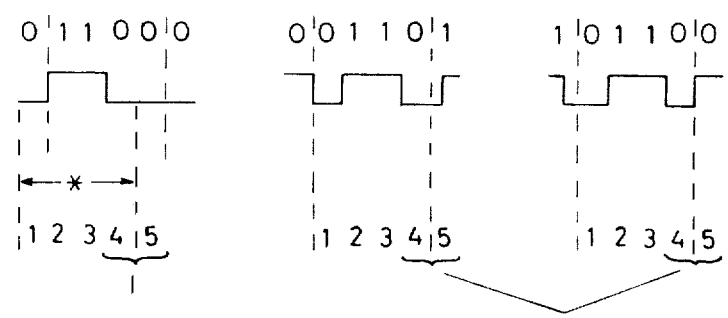
FIG. 6 is a pulse diagram illustrating the recognition of a substitute signal sequence.

Referring now to FIG. 5 in the decoder the incoming pulse sequence applied at a terminal 23 is applied to a Miller decoder 30 and is also subjected to a decoding sequence control. Substitute signal sequences 0110 and 0011 or their complements result in erroneous data being generated by decoder 30. This, however, has no effect on the remaining decoded pulse sequence, since the information in a data sequence in a Miller coding is contained in the level transitions and not in the levels themselves. To effect the sequence control, a shift register 23 transfers its information to a buffer storage 24 which, in turn, supplies the information to a network 25. If a substitute signal sequence is recognized, counter 27 blocks buffer storage 24 for the time required for four bits in order to prevent a further evaluation. In order to recognize the substitute signal sequence 0110, a testing of a fifth bit is required. In FIG. 6a in the position marked with an * the sequence control would report an 0110 substitute sequence. In order to prevent this, the next following bit is also compared to the last bit of the reported sequence. Only for different levels is a true 0110 substitute signal sequence really present (FIGS. 6b and 6c).

The substitute signal sequences cause the original NRZ-L sequence to be read out from storage 28 or 29 and to be incorporated by the exchanger 31 into the decoder signal sequence. At the decoding output 32, the complete NRZ-L signal sequence is then available.

Figure 7:
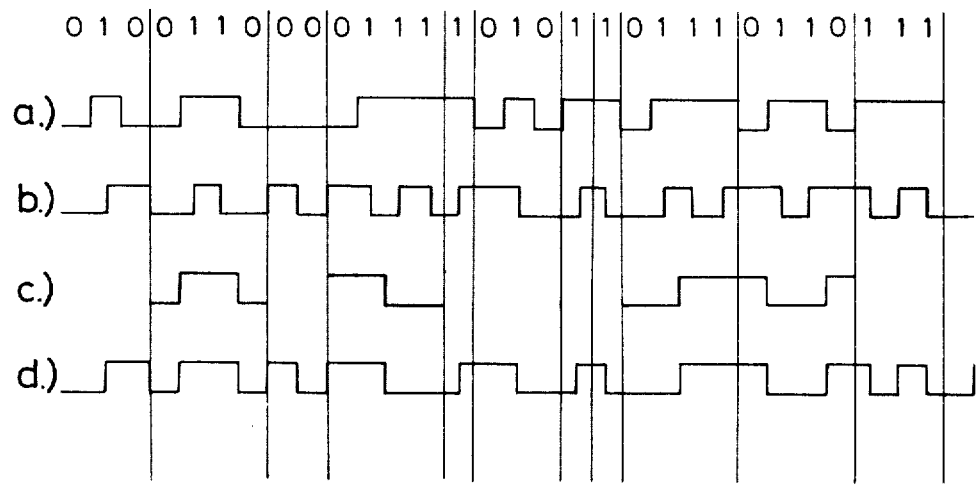
FIG. 7 is a pulse diagram illustrating the generation of a code having no DC component.

FIG. 7a shows an NRZ-L pulse sequence, FIG. 7b the same sequence coded in the Miller code, and FIG. 7c the substitute signal sequences which, after sequence control and level control are incorporated into the pulse sequence 7b. The result is the ML code having no DC component as shown in FIG. 7d.

A more detailed explanation of the encoding and decoding system will now be given with reference to FIG. 4a and 5a.

Figure 4A:
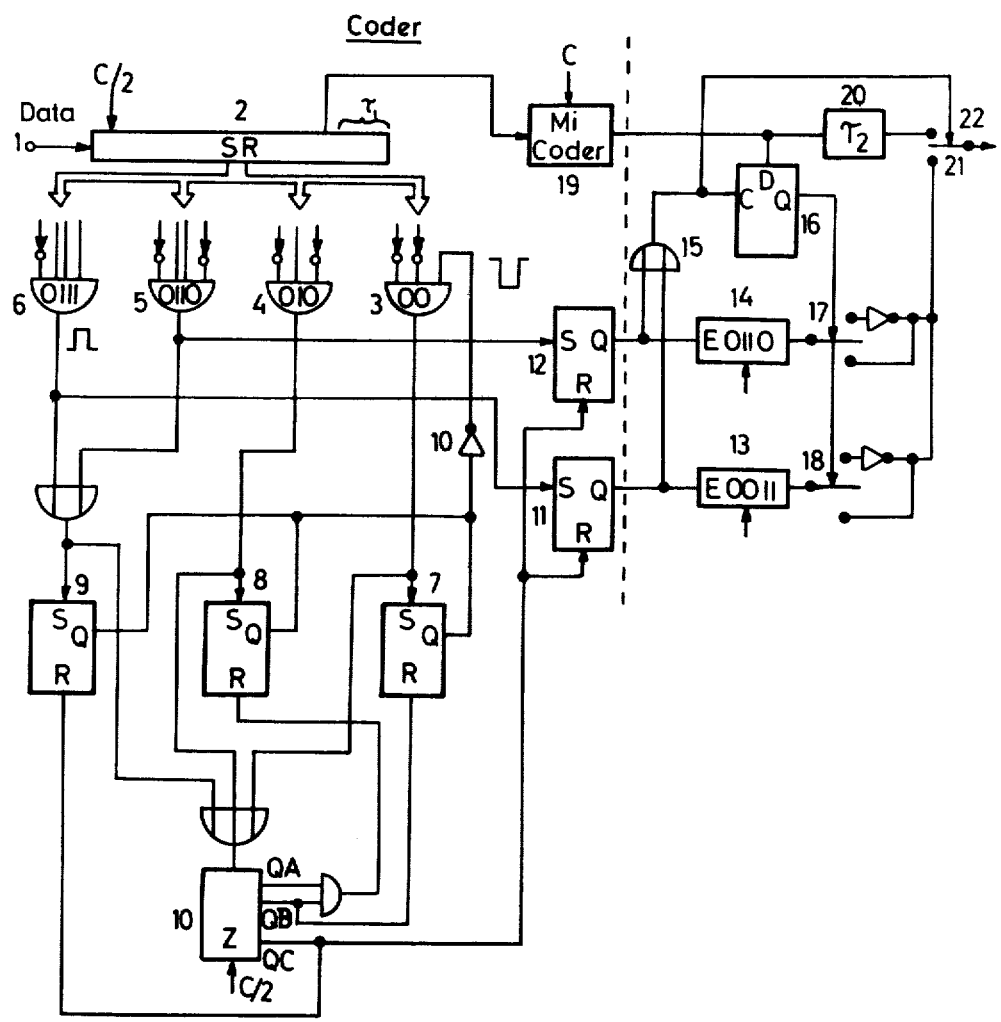
FIG. 4a is a more detailed diagram of the coding system of the present invention.
Figure 5A:
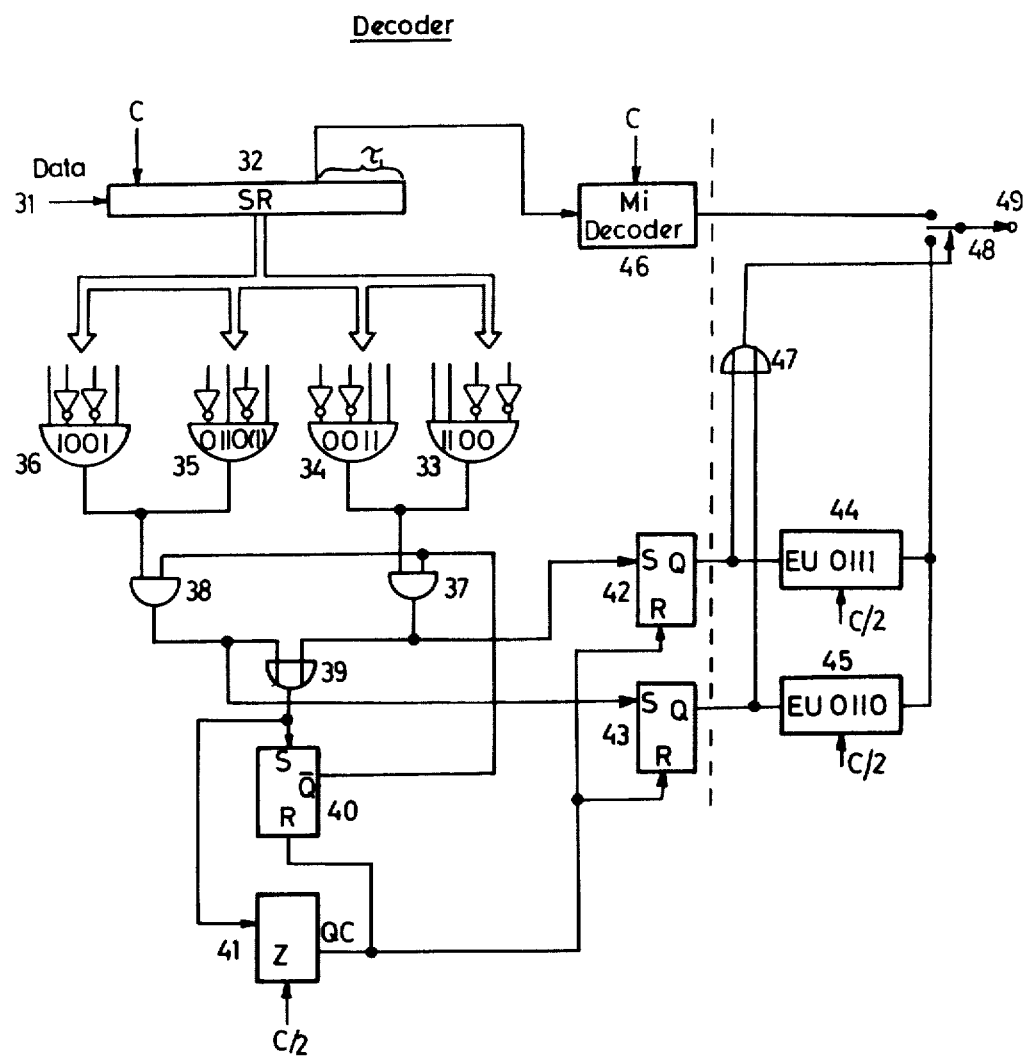
FIG. 5a is a more detailed diagram of the decoding system of the present invention.

Referring first to FIG. 4a, the incoming NRZ-L sequence is received at terminal 1 and read into shift register 2. Four AND gates 3, 4, 5 and 6 are connected to the outputs of shift register 2. Specifically, AND gate 3 has two inverting inputs connected to the first two bits in the shift register, thereby generating an output if the combination 00 is present. AND gate 4 has inverting inputs connected to the first and third bit and a direct input connected to the fourth bit thereby generating an output when the combination 010 is present. AND gates 5 and 6 similarly test for the presence of the combinations 0110 and 0111, respectively. The output of AND gate 3 is connected to the input of a flip-flop 7 whose Q output is connected through an inverter 10 to a direct input of AND gate 3. The output of AND gate 4 is connected to the set input of a flip-flop 8, while the outputs of AND gates 5 and 6 are connected through an OR gate 5' to the set input of a flip-flop 9. The Q outputs of flip-flops 7, 8 and 9 are connected through an inverter 10 to a direct input of AND gate 3. Further, the outputs of AND gates 3 and 4 and of OR gate 5' are connected through an OR gate 8' to the input of a counter 10'. In the presence of the combinations 00, 010, or 0110 or 0111 flip-flops 7,8 and 9 are set, respectively. AND gate 3 is blocked by the Q output because of inverter 10. This has the same effect as a "1" signal in the first bit of the shift register. If no signal appears at the outputs of AND gates 3 4, 5 and 6 the data is processed unchanged. When a set pulse is applied to any one of flip-flops 7, 8, 9, counter 10' is reset to zero. Clock pulses denoted by C/2 are applied to the counting input of counter 10'. The counting outputs of counter 10' are so connected to flip-flops 7, 8 and 9 that flip-flop 7 is reset after two clock pulses, flip-flop 8 after three, and flip-flop 9 after four. The Q output of the flip-flops then carries a "0" signal so that AND gate 3 is enabled, and the next following data bits may be tested. This circuit allows the information in the shift register to be blocked from AND gates 3, 4, 5 and 6 for the requisite number of clock pulses following the evaluation of the four pulse sequences so that a second evaluation of the same pulse sequences will be prevented.

The outputs of AND gates 5 and 6 are further connected to set inputs of flip-flops 11 and 12, respectively. The reset input of both flip-flops 11 and 12 is connected to the QC output of counter 10', namely the counter which resets flip-flop 9. The Q outputs of flip-flops 11 and 12 are connected to the enable inputs of substitute signal storages 13 and 14, respectively. The Q outputs of flip-flops 11 and 12 are further connected through an OR gate 15 to the clock input of a flip-flop 16. Flip-flop 16 thus carries at its Q output a signal corresponding to that then-present at its D input, namely the signal then present at the output of Miller coder 19. Flip-flops 11 and 12 are thus set if a 0111 or a 0110 sequence is detected, respectively. The Q output of these flip-flops then enables storages 13 and 14 to furnish the substitute signal sequence. Simultaneously flip-flop 16 is activated via OR gate 15. The Q output of flip-flop 16 then determines the position of switches 17 and 18, that is whether the number stored in storages 14 and 13, respectively, or its complement will be used as the substitute signal sequence. The input of Miller coder 19 is connected to the output of shift register 2. Specifically, synchronization with respect to time of the output of the Miller coder and the substitute signal sequence is achieved in that the data sequence applied to the Miller coder is derived from a tap on the shift register which precedes the first bit by a number of stages corresponding to the time delay τ of the Miller code. The synchronization is so selected that when the clock pulse is applied to flip-flop 16 the information at the D input of flip-flop 16 is the level of the first Miller signal of the pulse sequence for which the substitute signal sequence is to be used. Any resulting asynchronization with respect to time is compensated for by an additional delay element 20. A switch 21 connects output terminal 22 either to the output of additional delay 20 or to receive the substitute signal sequence, under control of the same signal applied to the clock input of flip-flop 16. After four clock pulses, the QC output of counter 10' furnishes the reset pulse which blocks storages 13 and 14 and switches switch 21 back to the position in which the output of the Miller coder is applied to terminal 22.

To describe the decoding process, reference will now be made to FIG. 5a. The incoming M1 pulse sequence is applied to shift register 32, subjected to a sequence control and then applied to Miller decoder 46. Such a Miller coder as well as a Miller decoder can be found in U.S. Pat. No. 3,108,261, which is hereby incorporated by reference. Substitute sequences 0110 or 0011 or the complements thereof result in wrong data being generated in decoder 46. This, however, has no effect on the remaining decoded pulse sequence, since the information in a data sequence coded in accordance with the Miller code depends upon the level transitions and not the levels themselves. The sequence control, namely to determine whether sequences 0110 or 0111 or their complements are present, is carried out by AND gates 33, 34, 35 and 36, connected to the outputs of shift register 32. The outputs of AND gates 33 and 34 are connected in common to one input of an AND gate 37. Similarly, the outputs of AND gates 35 and 36 are connected in common to one input of an AND gate 38. The outputs of AND gates 37 and 38 are connected to respective inputs of an OR gate 39 whose output is in turn connected to the set input of a flip-flop 40. The $\overline{Q}$ output of flip-flop 40 is connected to the second inputs of AND gates 37 and 38. The output of OR gate 39 is further connected to the reset input of a counter 41 whose counting input receives clock pulses. The QC output of counter 41 is connected to the reset input of flip-flop 40. The output of AND gates 37 and 38 are further connected to the set inputs of a flip-flop 42 and 43, respectively. The reset inputs of flip-flops 42 and 43 are connected in common to the QC output of counter 41. The Q outputs of flip-flops 42 and 43 are connected to respective inputs of an OR gate 47 and to the enable inputs of storages 44 and 45, respectively. The output of OR gate 47 controls a switch 48 which switches either the outputs of storages 44 and 45 or the output of Miller decoder 46 to output terminal 49.

If any of the sequences 0110, 0011 or their complements are detected, an output appears at one of the AND gates 33, 34, 35, 36 which causes flip-flop 40 to be set. Simultaneously, counter 41 is reset to zero. After the receipt of four clock pulses, counter 41 furnishes a signal at its QC output which resets flip-flop 40 and also flip-flops 42 and 43. The output of flip-flop 40 blocks AND gates 37 and 38 for the time of the four clock pulses so that an extra evaluation of the data in the shift register is prevented. In trying to determine the presence of the substitute signal sequence 0110, a further, fifth bit is required. Referring to the left most portion of FIG. 6, at the place indicated with an * the decoder system would signal the presence of a substitute sequence 0110. In order to prevent this, the next subsequent bit is compared to the last bit in the so-reported sequence. Only if these two bits have different levels is a true 0110 substitute signal sequence present (see the remainder of FIG. 6). For this purpose, flip-flops 42 and 43 are set by the outputs of AND gates 37 and 38, respectively. The Q outputs enable storages 44 and 45 containing, respectively, sequences 0111 and 0110. Since the output of counter 41 is also connected to the reset inputs of flip-flops 42 and 43, the Q output of these flip-flops is activated only for the time of four clock signals. The synchronization with respect to time of the output of Miller decoder 46 and of the storages is achieved here in the same fashion as it was achieved in the coder, that is the input to the Miller coder is derived from a point in the shift register which precedes its last bit by a time $\tau_1$ which corresponds to the time required for processing in the Miller decoder 46. The Q outputs of flip-flops 42 and 43 simultaneously control the position of switch 48 so that either the output of Miller decoder 46 or the output of the enabled one of storages 44 and 45 is applied to output terminal 49 as appropriate.

Various changes and modifications may be made within the scope of the inventive concepts.

I claim:

1. Method for eliminating the DC component in the transmission of a sequence of data bits coded in a code wherein predetermined combinations of sequential data bits create a DC component, comprising the steps of
scanning said sequence of data bits to locate a predetermined number n of sequential data bits together creating a DC component; and
transmitting a sequence of substitute bits together creating no DC component instead of said predetermined number of sequential data bits.

2. A method as set forth in claim 1, wherein said sequence of substitute bits comprises a plurality of bits equal in number to said predetermined number of sequential data bits.

3. A method as set forth in claim 2, wherein said sequence of substitute bits comprises a combination of bits absent in said code of said data bits.

4. A method as set forth in claim 1, further comprising the step of receiving said sequence of data bits with said sequence of substitute bits;
detecting the presence of said sequence of substitute bits; and
reinserting said predetermined number of sequential data bits together creating said DC components into said sequence of data bits to replace said sequence of substitute bits.

5. Method for eliminating the DC component in the transmission of a sequence of data bits coded in a code wherein predetermined combinations of sequential data bits create a DC component, comprising the steps of
scanning said sequence of data bits to locate a predetermined number n of sequential data bits together creating a DC component;
transmitting a sequence of substitute bits together creating no DC component instead of said predetermined number of sequential data bits;
wherein said sequence of data bits is transmitted in successive clock bit cells;
wherein a logic "1" and a logic "0" are transmitted as signal level changes at a first and second predetermined time, respectively, in respective bit cells;
wherein said signal level changes include changes from a first to a second second and changes from said second to said first signal level; and
wherein said sequence of substitute bits has a beginning and end level equal to the beginning and end level of the so-located predetermined number n of sequential data bits.

6. A method as set forth in claim 5, wherein said sequence of data bits is coded in a Miller code;
wherein said predetermined number n is equal to four; and
wherein said sequence of substitute bits is coded in the NRZ-L code.

7. A method as set forth in claim 6, wherein a first and a second combination of four data bits creates a DC component; and
wherein a first or a second sequence of substitute bits is transmitted instead of said first and second combination of data bits, respectively, when said sequential data bits start at said first signal level, and the complements of said first and second sequence of substitute bits is transmitted when said predetermined number of sequential data bits together creating said DC components starts at said second signal level.

8. Apparatus for eliminating the DC component in the transmission of a sequence of data bits coded in a code wherein predetermined combinations of sequential data bits create a DC component, comprising
means (2–10) for scanning said sequence of data bits to locate a predetermined number of sequential data bits together creating a DC component; and
means (15–20) connected to said scanning means for transmitting a sequence of substitute bits not creating a DC component instead of the so-located sequence of data bits.

9. Apparatus for eliminating the DC component in the transmission of a sequence of data bits coded in a code wherein predetermined combinations of sequential data bits create a DC component, comprising
means (2–10) for scanning said sequence of data bits to locate a predetermined number of sequential data bits together creating a DC component;
means (15–20) connected to said scanning means for transmitting a sequence of substitute bits not creating a DC component instead of the so-located sequence of data bits;
wherein said scanning means comprises shift register means (2) having a predetermined number of storage locations corresponding to said predetermined number of sequential bits together creating a DC component, AND gate means (5) having a plurality of inputs equal to said predetermined number connected to respective ones of said storage locations for furnishing an AND gate output signal when said predetermined number of sequential data bits together creating said DC component is in said storage locations;
wherein said sequence of data bits is shifted through said shift register means in sequential bit time cells; and
wherein said means for transmitting a sequence of substitute bits transmits said sequence of substitute bits in response to said AND gate output signal.

10. Apparatus as set forth in claim 9, wherein said AND gate means comprises first and second AND gate means for, respectively, furnishing a first and second AND gate output signal in the presence of a first and second combination of said sequential data bits, each creating said DC component; and wherein said means for transmitting a sequence of substitute bits comprises means for transmitting a first sequence of substitute bits in response to said first AND gate output signal and a second sequence of substitute bits in response to said second AND gate output signal.

11. Apparatus as set forth in claim 10, wherein said predetermined number of sequential data bits together creating a DC component includes four data bits; and
wherein said scanning means further comprises third and fourth (3, 4) AND gate means having, respectively, two and three inputs connected to, respectively, the first and second and the first, second and third one of said storage locations for furnishing, respectively, a third and fourth AND gate output signal in the presence of data bits together lacking a DC component and means (7-12) connected to said AND gate means for impeding said transmission of said sequence of substitute bits for respectively, two and three bit time cells in response to said third and fourth AND gate output signal, respectively.

* * * * *